May 17, 1955     W. G. DE VERTER     2,708,710

SOLDERING POT

Filed March 27, 1951

Inventor:
Walton G. DeVerter
By: Alois W. Graf
Attorney

United States Patent Office 2,708,710
Patented May 17, 1955

2,708,710

SOLDERING POT

Walton G. De Verter, Chicago, Ill.

Application March 27, 1951, Serial No. 217,772

4 Claims. (Cl. 219—44)

The present invention relates to an improved electrical soldering pot.

In the manufacture of electrical devices it has been found advantageous in many cases to complete the electrical connections by dipping them into liquid solder. This provides a good joint with a minimum amount of solder. In the past, however, certain soldering pots have been provided which had disadvantages. Among these disadvantages was the inability to maintain the solder at an even temperature. Furthermore, it has been found difficult to maintain solder pots at a relatively high temperature. Still another disadvantage of previous solder pot arrangements has been the shape of the pot which precluded dipping certain assemblies or components into the pot in order to produce the soldering.

It therefore is an object of the present invention to provide an improved solder pot suitable for dipping electrical connections and yet have adequate safety features.

Still another object of the present invention is to provide an electrically heated solder pot construction whereby the crucible temperature may be maintained at a comparatively high level.

A still further object of the invention is to provide an improved method of constructing an electrically heated crucible.

Still another object of the invention is to provide an improved solder pot with a thermostatic control element which maintains the heat of the crucible within relatively small temperature variations.

A still further object of the present invention is to provide an improved solder pot having inclined sides adjacent the crucible edge which carries a removable splash guard.

Other and further objects of the present invention subsequently will become apparent by reference to the following description taken in conjunction with the accompanying drawing wherein.

Figure 1:
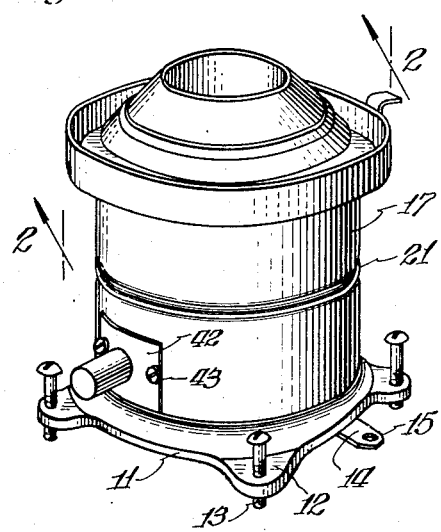
Figure 1 is a perspective view of a solder pot embodying the present invention.
Figure 2:
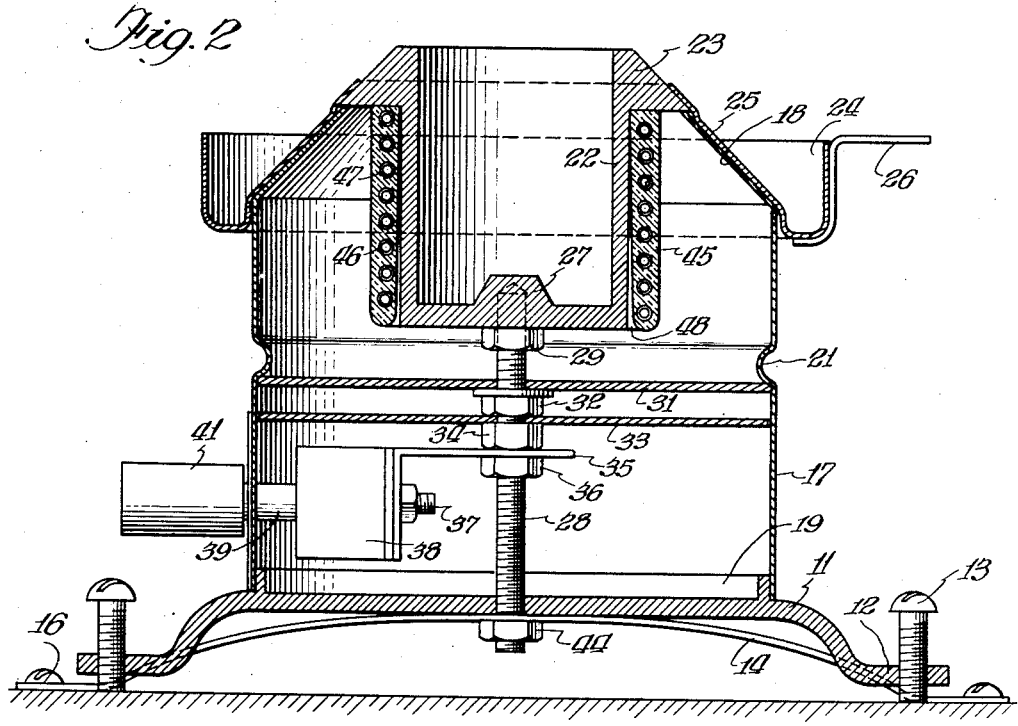
Figure 2 is a cross-sectional view as seen in the direction of the arrows along the line 2—2 of Figure 1.

Referring to Figures 1 and 2 of the drawing there is shown an electrically heated solder pot having a multi-legged base 11 having a plurality of projections or feet 12, each provided with a leveling screw 13. Beneath the base 11 is a mounting strap 14 having at each end an aperture 15 which receives a fastening screw 16 to hold the pot safely in position on a work bench. The base 11 carries a housing 17 of generally cylindrical shape, terminating in a frusto-conical portion 18. The base 11 within the housing 17 may be provided with a suitable ridge or other projection 19 to hold the housing 17 in position. At an intermediate point the cylindrical housing 17 is provided with an annular recess 21, the purpose of which subsequently will become apparent. Within the housing 17 is a crucible 22 having a rim in the form of a frusto-conical flange 23. An annular splash guard 24 has a frusto-conical portion 25 which rests upon the frusto-conical portion 18 of the housing 17 and a portion of the crucible flange 23. In order that the splash guard 24 may be readily removed for cleaning and for salvaging solder therein, a suitable handle 26 is attached thereto.

The crucible 22, which generally is made of metal such as cast iron, may be provided with an axial boss 27 suitably apertured and threaded so as to receive a threaded rod or stud 28. The threaded rod or stud 28 may be locked into relation with the crucible 22 by a suitable lock nut 29. The crucible 22 is held in position on the top of the housing 17 by a plate 31 which engages the underside of the inwardly extending recess 23. A suitable nut 32 exerts pressure against the plate 31. Immediately below the nut 32 is a heat deflection plate 33 provided to further reduce the effects of heat radiation from the crucible 22 into the lower compartment of the housing 17. This plate 33 is held in position by another nut 34, which in turn is engaged by a bracket 35 engaged by a nut 36. The bracket 35 is a right angled bracket having a suitable aperture for receiving a mounting stud 37 of a thermostat switch 38. The thermostat switch is thus mounted to be in a heat conductive relation through a metallic path connected to the center of the bottom of the crucible 22. The thermostat switch 38 has a shaft 39 which extends to the exterior of the housing 17. A suitable knob 41 is mounted on the shaft 39 and the knob may have a mark or pointer thereon for cooperation with an indicator dial or plate 42 mounted on the outside of the housing 17 by suitable fastening means, such as screws 43. The housing 17 in addition to being held in position by the flange 19 of the base 11, is retained in position by the stud 28 which extends through the base and carries a nut 44 which engages the mounting strap 14.

Figure 3:
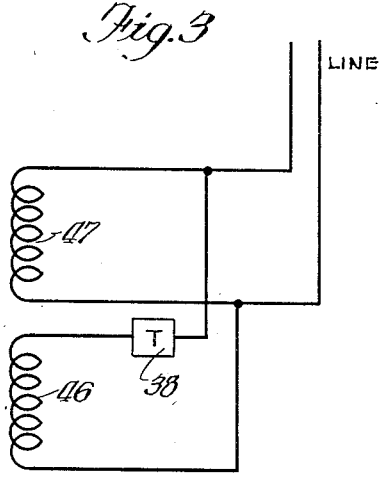
Figure 3 is an electrical circuit diagram corresponding to that employed in the present invention.

The crucible 22 preferably has a cylindrical exterior shape about which is positioned an electrical heating element embedded in a suitable one-piece ceramic insulator. Thus a ceramic element 45 surrounds the exterior of the crucible 22 and carries embedded electric resistance wire elements 46 and 47. The circuit arrangement illustrated in Figure 3 shows that one heating element is connected directly to the source of electric power and the other heating element is connected through the thermostat switch 38 to regulate the temperature of the solder within the crucible 22.

It will be noted from Figure 2 that a clearance 48 has been provided between the ceramic insulator 45 and the crucible 22. In accordance with the present invention, this clearance tapers from the top of the crucible 22 to a greater amount adjacent the bottom of the crucible. It has been found that the lower portion of the crucible 22 will expand to a greater degree than the upper portion.

In accordance with the present invention, a novel method of constructing and applying the electric heating element is employed. The outer surface of the crucible 22 is covered with a layer of material which is subject to disintegration at a temperature less than the firing temperature of the ceramic element 45. For example, there may be wrapped about the crucible 22 layers of paper and a suitable adhesive, such as a refractory cement which disintegrates above a certain temperature, so that the layer is thicker at the bottom of the crucible. About this there is placed a layer of raw ceramic. In this layer of ceramic there are then formed grooves for receiving the electrical resistance wires forming the electric heating elements 46 and 47. When these have been placed in position, another layer of ceramic is applied so as to cover the resistance wires and thoroughly embed them in ceramic. The crucible with the raw ceramic coating is then placed in a suitable kiln and fired. During the firing process disintegration takes place in the material applied directly to the crucible 22 so as to leave the tapered clearance 48 shown in Figure 2. By this construction it has been found that the soldering pot can be maintained at a higher temperature than has been possible through other construction.

From the foregoing it will be appreciated that in accordance with the present invention there has been provided an improved solder pot having an adjustable thermostat which operates at less than the total capacity of the heating element and furnishes the necessary temperature control for the optimum high speed soldering results. The tapered crucible shape together with the tapered housing shape allows spaced items to be dipped. The detachable splash guard provides protection to the operator against burns caused by splashing or overflow of solder. The guard furthermore provides a convenient method of salvage of solder and affords a receptacle to receive dross. Thus the bench is maintained clean around the solder pot, free from dross and solder.

The adjusting screws provide for leveling the pot and yet the fastening strap holds the pot securely in position to prevent any accidental tipping.

While for the purpose of illustrating and describing the present invention a preferred embodiment has been shown in the drawing, it is to be understood that variations in the construction illustrated are contemplated as may be commensurate with the spirit and scope of the invention set forth in the accompanying claims.

I claim as my invention:

1. The combination comprising a cylindrical metal crucible having a downwardly and outwardly tapered flange edge, a housing for said crucible having an upper portion forming an extension of said flange edge and supporting said crucible, a sheet metal splash guard supported by said upper portion of said housing and comprising an annular body having an inclined center portion complementary to the edge of said crucible and the upper portion of said housing and a concave peripheral portion, and an electric heating element surrounding said crucible.

2. The combination comprising a cylindrical metal crucible having a frusto-conical flange edge, a cylindrical housing for said crucible having a frusto-conical upper portion forming an extension of said flange edge and directly supporting said crucible, a removable sheet metal splash guard supported by said frusto-conical upper portion of said housing and comprising an annular body having a frusto-conical center portion covering the upper portion of said housing and overlapping said crucible edge and a concave peripheral portion, and an electric heating element surrounding the vertical wall of said crucible.

3. The combination comprising a cylindrical metal crucible having a frusto-conical flange edge, a cylindrical housing for said crucible having a frusto-conical upper portion forming an extension of said flange edge, a removable splash guard supported by the upper portion of said housing and comprising an annular body having a frusto-conical center portion and a concave peripheral portion, an electric heating element surrounding said crucible, a stud bolt connected to said crucible at its axis, a radiant heat barrier mounted on said stud to divide said housing into upper and lower chambers, a thermostatic switch mounted on said stud in said lower chamber, and electrical conductors interconnecting said switch with said heating element and a source of electric power.

4. The combination comprising a metal crucible having a frusto-conical flange edge, a cylindrical housing for said crucible, a removable splash guard supported by said housing and comprising an annular body having a frusto-conical center portion and concave peripheral portion, an electric heating element surrounding said crucible, a stud bolt connected to said crucible at its axis, a radiant heat barrier mounted on said stud to divide said housing into upper and lower chambers, a thermostatic switch mounted in said lower chamber to receive heat conducted by said stud, and electrical conductors interconnecting said switch with said heating element and a source of electric power.

References Cited in the file of this patent

UNITED STATES PATENTS

| 1,158,971 | Boeck | Nov. 2, 1915 |
| 1,394,954 | Van Aller | Oct. 25, 1921 |
| 1,545,852 | Rohne | July 14, 1925 |
| 1,705,714 | Carpenter et al. | Mar. 19, 1929 |
| 1,707,295 | Woodson | Apr. 2, 1929 |
| 1,715,678 | Schneider | June 4, 1929 |
| 1,738,908 | Kuhn et al. | Dec. 10, 1929 |
| 1,809,089 | Wiegand | June 9, 1931 |
| 1,924,638 | Clawson | Aug. 29, 1933 |
| 2,212,100 | Keaton | Aug. 20, 1940 |
| 2,235,911 | Wilcox | Mar. 25, 1941 |
| 2,522,718 | Huck | Sept. 19, 1950 |
| 2,596,325 | Gerny | May 13, 1952 |

FOREIGN PATENTS

| 11,993 | Great Britain | May 22, 1913 |
| 504,000 | Great Britain | July 28, 1930 |